US005461533A

United States Patent [19]

Yoshida et al.

[11] Patent Number: 5,461,533

[45] Date of Patent: Oct. 24, 1995

[54] OVERVOLTAGE PROTECTION DEVICE HAVING A CONCAVE ARC SECTION

[75] Inventors: Shigeru Yoshida, Hino; Yukio Tsuchida, Tokyo, both of Japan

[73] Assignees: Kabushiki Kaisha Toshiba, Kawasaki; Nichicon Corporation, Kyoto, both of Japan

[21] Appl. No.: 192,823

[22] Filed: Feb. 7, 1994

[30] Foreign Application Priority Data

Feb. 8, 1993 [JP] Japan ................................ 5-019765

[51] Int. Cl.$^{6}$ ................................ G02H 9/06

[52] U.S. Cl. ................................ 361/112; 361/56; 361/91

[58] Field of Search ................................ 361/91–220, 88, 361/56; 313/309, 308, 306, 336, 351; 337/1

[56] References Cited

U.S. PATENT DOCUMENTS

| | | | |
|---|---|---|---|
| 1,406,858 | 2/1922 | Henricks et al. | 123/627 |
| 4,891,730 | 1/1990 | Saddow et al. | 361/56 |

FOREIGN PATENT DOCUMENTS

| | | |
|---|---|---|
| 51846/79 | 3/1980 | Australia . |
| 0211517 | 2/1981 | European Pat. Off. . |

OTHER PUBLICATIONS

Copy of European Patent Report dated 18 Apr. 1994.

*Primary Examiner*—A. D. Pellinen
*Assistant Examiner*—Michael J. Sherry
*Attorney, Agent, or Firm*—Finnegan, Henderson, Farabow, Garrett & Dunner

[57] ABSTRACT

An overvoltage protection device connected between an AC plug and an electronic device, comprises a first AC pattern having first and second concave circular arc sections and a first peak point, a second AC pattern having third and fourth concave circular arc sections and a second peak point, and a frame ground pattern having a fifth concave circular arc section with the first peak point as a center and a sixth concave circular arc section with the second peak point as a center, both ends of the fifth concave circular arc section being located at centers of the first and second concave circular arc sections, and both ends of the sixth concave circular arc section being located at centers of the third and fourth concave circular arc sections. If an overvoltage is applied to any of the first and second AC patterns, a discharge occurs across any of the AC pattern and the frame ground pattern, allowing the overvoltage to escape to ground. It is thus possible to prevent destruction of the electronic device resulting from the application of the overvoltage.

9 Claims, 2 Drawing Sheets

OVERVOLTAGE PROTECTION DEVICE HAVING A CONCAVE ARC SECTION

BACKGROUND OF THE INVENTION

1. Field of the Invention

The present invention relates to an overvoltage protection device which can prevent an electronic apparatus from being destroyed due to an overvoltage, such as a surge, caused by lightning, etc.

2. Description of the Related Art

Generally, an electronic apparatus is, when being used, supplied with a commercial power supply. In the case where lightning strikes a generating station, a transmission station, a substation, etc., a very high overvoltage (surge voltage) is momentarily applied to a power supply line through induction, sometimes causing the destruction of some element of the electronic apparatus. In the prior art, the electronic device has been protected by an arrester from such an overvoltage.

FIG. 1 is a block diagram showing a conventional overvoltage protection device using arresters. A power is supplied to an electronic device 1 by inserting an AC plug 2 of the electronic device 1 into an AC outlet 3 provided in a wall, a floor, etc., of a room. The AC outlet 3 has AC terminals **3*a* and 3*b* connected to commercial power supply lines (not shown) and a frame ground terminal 3*c*. The AC plug 2 has AC poles 2*a* and 2*b* connected to AC terminals 3*a* and 3*b* of the AC outlet and a frame ground pole 2*c* connected (grounded) to the frame ground terminal 3*c* of the AC outlet 3 through arresters 4 and 5**.

In such conventional device, when any overvoltage occurs on a commercial power supply line and is applied to any one of the AC poles **2*a* and 2*b* of the AC plug 2, a corresponding arrester is operated (turned ON), so that short-circuiting occurs between the frame ground electrode 2*c* of the AC plug 2 and any corresponding one of the AC poles 2*a* and 2*b* of the AC plug 2 which is applied with the overvoltage. As a result, the overvoltage escapes to ground and no overvoltage is supplied to the electronic device 1**.

The arrester has the disadvantage of being normally expensive and, further, its operation start voltage cannot be set at too high a level. Even if, therefore, any overvoltage is applied to the electronic device to a practically unaffected extent, a power supply to the electronic device is sometimes interrupted. This offers the disadvantage of the power supply being frequently interrupted to an unnecessary extent.

Since, as described above, the arrester is employed to protect an electronic device from an overvoltage such as a lightning surge, the overvoltage protection device involves high costs and, further, an unnecessary power supply stoppage has been encountered. The power supply stoppage while the electronic device being operated is not desirable and, sometimes, the electronic device functions abnormally.

SUMMARY OF THE INVENTION

Accordingly, it is an object of the present invention to provide an overvoltage protection device which can be manufactured at low costs.

A related object of the present invention is to provide an overvoltage protection device which can freely set a voltage at any given level which starts the stoppage of a power supply to the electronic device.

According to the present invention, there is provided an overvoltage protection device connected between an electronic device and a power supply outlet having a power supply pole and a ground pole, the power supply pole connected to a power supply line, the device comprising an insulating substrate; a first conductive member formed on the insulating substrate, connected to the power supply pole and having a peak point; and a second conductive member formed on the insulating substrate, connected to the ground pole and having a concave circular arc section of a given radius with the peak point as a center.

According to the present invention, there is provided another overvoltage protection device connected between an electronic device and a power supply outlet having a power supply pole and a ground pole, the power supply pole connected to a power supply line, the device comprising an insulating substrate; a first conductive member formed on the insulating substrate, connected to the power supply pole and having a first peak point and a first concave circular arc section of a given radius; and a second conductive member formed on the insulating substrate, connected to the ground pole and having a second concave circular arc section of the given radius with the first peak point as a center and a second peak point locating at a center of the first concave circular arc section.

According to the present invention, there is provided a further overvoltage protection device connected between an electronic device and a power supply outlet having first and second power supply poles and a ground pole, the first and the second power supply poles connected to an AC power supply line, the device comprising: an insulating substrate; a first conductive member formed on the insulating substrate, connected to the first power supply pole and having a first concave circular arc section of a given radius and a first peak point locating at one end of the first concave circular arc section; a second conductive member formed on the insulating substrate, connected to the second power supply pole and having a second concave circular arc section of the given radius and a second peak point locating at one end of the second concave circular arc section; and a third conductive member formed on the insulating substrate, connected to the ground pole and having a third concave circular arc section of the given radius with the first peak point as a center, a third peak point locating at one end of the third concave circular arc section, a fourth concave circular arc section of the given radius with the second peak point as a center, and a fourth peak point locating at one end of the fourth concave circular arc section.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

Figure 1:
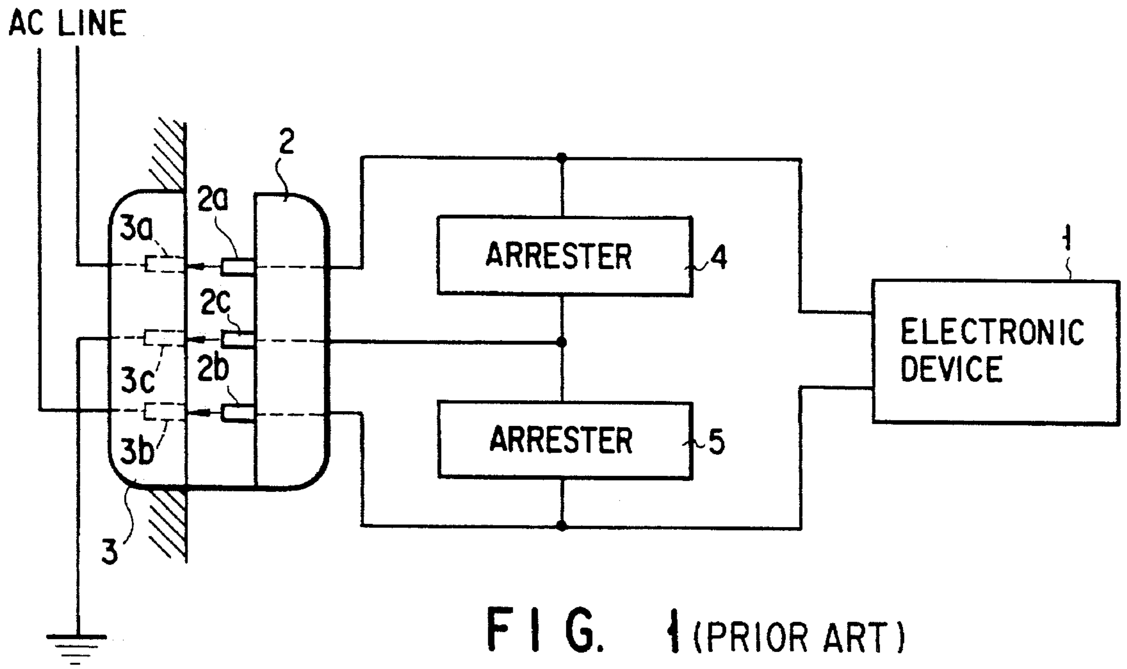
FIG. 1 (PRIOR ART)
FIG. 1 is a block diagram showing a conventional overvoltage protection device using arresters.
Figure 2:
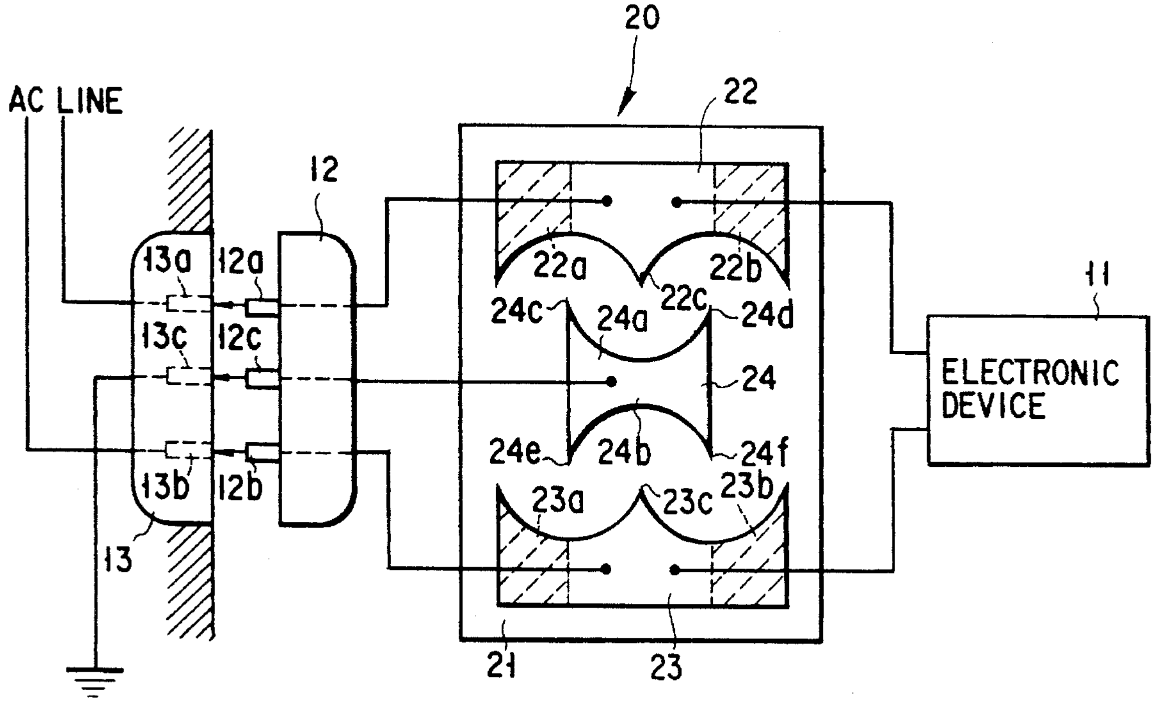
FIG. 2 is a block diagram showing an overvoltage protection device including a frame ground pattern according to a first embodiment of the present invention.

A preferred embodiment of an overvoltage protection device according to the present invention will now be described with reference to the accompanying drawings. FIG. 2 is a block diagram showing an arrangement of a first embodiment of the present invention. In the first embodiment, a power is supplied to the electronic device 11 by inserting an AC plug 12 of an electronic device 11 into an AC outlet 13 mounted on a wall, a floor, etc., of a room. The AC outlet 13 has AC terminals 13*a* and 13*b* connected to commercial power supply lines (not shown) and a frame ground terminal 13*c* grounded. An overvoltage protection device 20 is connected between the AC plug 12 and the electronic device 11 and has three kinds of copper foil patterns on an insulating substrate 21, that is, first and second AC patterns 22 and 23 and a frame ground pattern 24. Though not shown, a solder layer is formed on the copper foil to prevent the copper foil from being broken due to discharge. The AC plug 12 has AC poles 12*a* and 12*b* connected to the AC terminals 13*a* and 13*b* of the AC outlet 13 and also to the first and second AC patterns 22 and 23 and an AC pole 12*c* connected to the frame ground terminal 13*c* of the AC outlet 13 and also to the frame ground pattern 24. It is to be noted that the AC poles 12*a* and 12*b* of the AC plug 12 may sometimes be connected to the AC terminals 13*b* and 13*a*, respectively, in the AC outlet 13.

The AC patterns 22 and 23 have the same configuration and are symmetrically arranged relative to a frame ground pattern 24. That is, the AC patterns 22 and 23 are so formed as to provide a deformed rectangular pattern in which one of longer sides facing the frame ground pattern 24 is divided into two parts and these half parts are replaced by two concave circular arc sections 22*a*, 22*b*; and 23*a*, 23*b*, respectively. Each concave circular arc section has a center at a perpendicular bisector of the half part and a radius "r" passing through the junctions of two circular arc sections or through the corner of the rectangular. It is to be noted that the junction of the adjacent circular arc sections 22*a* and 22*b* is referred to as the peak point 22*c* and the junction of the adjacent circular arc sections 23*a* and 23*b*, as a peak point 23*c*.

The frame ground pattern 24 has the same configuration at those areas facing the AC patterns 22 and 23. That is, the frame ground pattern 24 is so formed as to provide a deformed rectangular pattern in which longer sides facing the AC patterns 22 and 23 are replaced by two concave circular arc sections 24*a* and 24*b*, respectively. Each concave circular arc section has a center at a perpendicular bisector of the longer side of the rectangular and a radius "r" passing through the corners of the rectangular. The four corners of the deformed rectangular pattern provide four peak points 24*c*, 24*d*, 24*e* and 24*f*.

Thus the respective concave circular arc sections have the same radius, it can be expressed that the patterns 22, 23, and 24 are arranged as will be set out below. The AC patterns 22 and 23 are so located that the circular arc sections 22*a* and 22*b* face the circular arc sections 23*a* and 23*b*, respectively, with the frame ground pattern 24 formed therebetween. As a result, the distances defined below are all equal to the radius "r" of the concave circular arc sections.

(1) The distance between each points on the concave circular arc section 22*a* of the AC pattern 22 and the peak point 24*c* of the frame ground pattern 24.

(2) The distance between each point on the concave circular arc section 22*b* of the AC pattern 22 and the peak point 24*d* of the frame ground pattern 24.

(3) The distance between the peak point 22*c* of the AC pattern 22 and each point on the concave circular arc section 24*a* of the frame ground pattern 24.

(4) The distance between each point on the concave circular arc section 23*a* of the AC pattern 23 and the peak point 24*e* of the frame ground pattern 24.

(5) The distance between each point on the concave circular arc section 23*b* of the AC pattern 23 and a peak point 24*f* of the frame ground pattern 24.

(6) The distance between the peak point 23*c* of the AC pattern 23 and each point on the concave circular section 24*b* of the frame ground pattern 24.

From these it follows that (a) The concave circular arc section 22*a* of the AC pattern 22 corresponds to a circular arc section having the radius "r" with a peak point 24*c* of the frame ground pattern 24 as a center;

(b) The concave circular arc section 22*b* of the AC pattern 22 corresponds to a circular arc section having the radius "r" with the peak point 24*d* of the frame ground pattern 24 as a center;

(c) The concave circular arc section 23*a* of the AC pattern 23 corresponds to a circular arc section having the radius "r" with the peak point 24*e* of the frame ground pattern 24 as a center;

(d) The concave circular arc section 23*b* of the AC pattern 23 corresponds to a circular arc section having the radius "r" with the peak point 24*f* of the frame ground pattern 24 as a center;

(e) The concave circular arc section 24*a* of the frame ground pattern 24 corresponds to a circular arc section having the radius "r" with the peak point 22*c* of the AC pattern 22 as a center; and (f) The concave circular arc section 24*b* of the frame ground pattern 24 corresponds to the circular arc section having the radius "r" with the peak point 23*c* of the AC pattern 23 as a center.

The operation of this embodiment thus arranged will be explained below. At a normal time, a commercial AC power is supplied to the electronic device 11 through the AC outlet 13, AC plug 12, and AC patterns 22 and 23. When any abnormal overvoltage is induced in the AC power supply line due to an effect of lightning involved, the following phenomena occur in the overvoltage protection apparatus.

(I) When the AC patterns 22 and 23 are "hot" and "neutral" and any negative overvoltage occurs, a discharge is developed from the peak point 22*c* of the AC pattern 22 toward the concave circular arc section 24*a* of the frame ground pattern 24.

(II) when the AC patterns 22 and 23 are "hot" and "neutral" and any positive overvoltage occurs, a discharge is developed from the peak points 24*c* and 24*d* of the frame ground pattern 24 toward the concave circular arc sections 22*a* and 22*b* of the AC pattern 22.

(III) When the AC patterns 22 and 23 are "neutral" and "hot" and any negative overvoltage occurs, a discharge is developed from the peak point 23*c* of the AC pattern 23 toward the concave circular arc section 24*b* of the frame ground pattern 24.

(IV) When the AC patterns 22 and 23 are "neutral" and "hot" and any positive overvoltage occurs, a discharge is developed from the peak points 24*e* and 24*f* of the frame ground patter 24 toward the concave circular arc sections 23*a* and 23*b* of the AC pattern 23.

That is, short-circuiting occurs between the AC patterns 22 and 23 in the "hot" state and the frame ground pattern 24 whereby almost all overvoltage goes to ground.

Here a discharge start voltage, that is, a lowest voltage at which a discharge occurs between the AC patterns 22 and 23 on one hand and the frame ground pattern on the other hand is determined by a distance (here all the distances are set to be constant, that is, "r") between the peak point 22*c* and the concave circular arc section 24*a*, the peak point 23*c* and the concave circular arc section 24*b*, the peak point 24*c* and the concave circular arc section 22*a*, the peak point 24*d* and the concave circular arc section 22*b*, the peak point 24*e* and the concave circular arc section 23*a*, and the peak point 24*f* and the concave circular arc section 23*b*. In a practical case, the discharge start voltage is of the order of 1 kV at the distance "r" of 1 mm. Thus, at the distance "r" of 4 mm for instance, the discharge start voltage is of the order of 4 kv. It is, therefore, possible to set the discharge start voltage at a desired level.

The discharge start voltage can be set at a greater level by setting, at a greater value, the distance "r" between the AC patterns 22 and 23 on one hand and the frame ground pattern 24 on the other hand. Further, these three patterns can be readily manufactured at low costs by printing them on a printed circuit board, etc. Since the discharge start voltage can be set by the distance "r" between the AC patterns 22 and 23 on one hand and the frame ground pattern 24 on the other hand, it is possible to readily realize discharge start voltages of a varying level. Since the discharge is occurred between those areas of uniform distance ("r"), a stable discharge is developed at all times. Further, a uniform discharge current flows at all points along the concave circular arc section without being concentrated locally so that it allows fatigue to be distributed only along the concave circular arc section involved.

The first embodiment may be modified such that those dotted hatched areas in FIG. 2 are omitted.

Figure 3:
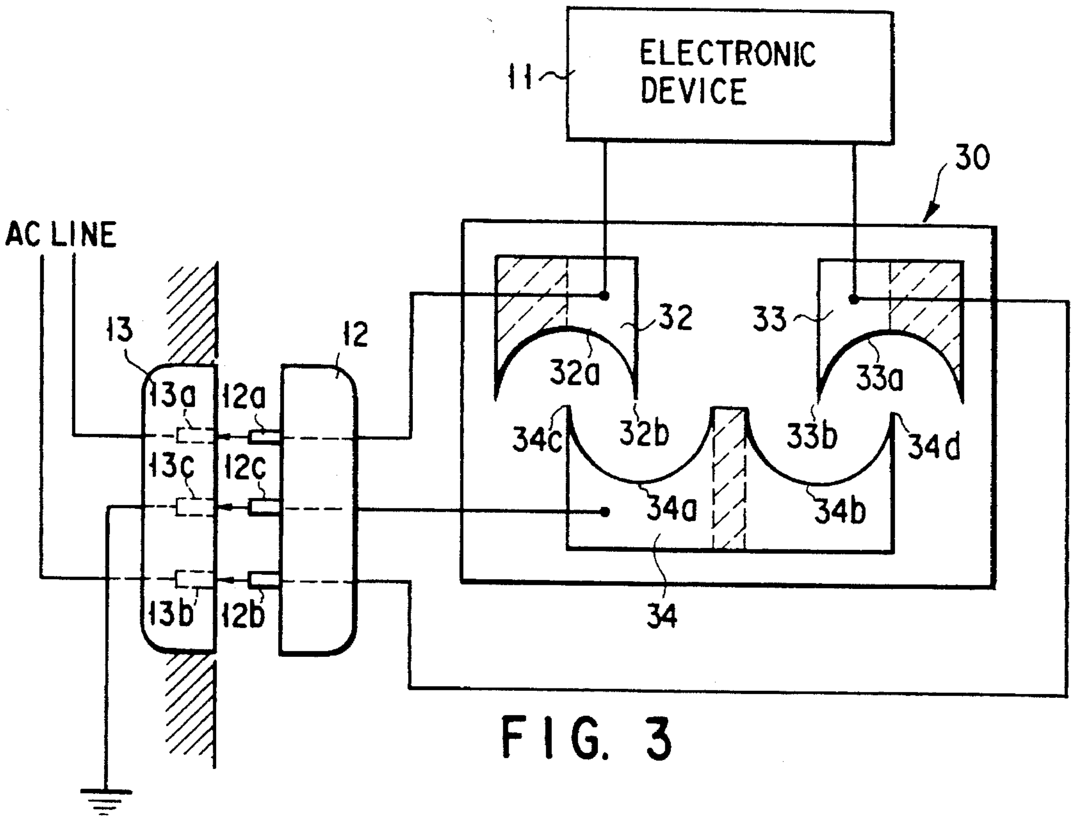
FIG. 3 is a block diagram showing an overvoltage protection device including a frame ground pattern according to a second embodiment of the present invention.

FIG. 3 is a block diagram showing an arrangement according to a second embodiment of the present invention. The overvoltage protection device 30 of the second embodiment is the same as that of the first embodiment in terms of their principle, though being different from that of the latter embodiment in terms of the configurations of their AC patterns 32 and 33 and their arrangement. In the second embodiment, first and second AC patterns 32 and 33 are arranged one to the left and one to the right with a frame ground pattern 34 located to face these AC patterns. The AC patterns 32 and 33 have concave circular arc sections 32*a* and 33*a*, respectively, having radiuses "r" with peak points 34*c* and 34*d* of the frame ground pattern 34 as centers, respectively. The frame ground pattern 34 has a pair of concave circular arc sections 34*a* and 34*b* having radiuses "r" with adjacent peak points 32*b* and 33*b* of the AC patterns 32 and 33 as their centers, respectively.

The overvoltage protection device 30 performs the same effect as the first embodiment.

The second embodiment may be modified such that those pattern areas indicated by the dotted hatched areas in FIG. 3 are omitted. In this case, the frame ground pattern 34 may be separated into two frame ground patterns or the two concave circular arc sections 34*a* and 34*b* may be directly joined in a side-by-side fashion, as indicated by the AC patterns 22 and 23 of the first embodiment in FIG. 2, with their joined hatched areas omitted. In the latter case, the distance between the two AC patterns 32 and 33 is narrowed by an extent corresponding to that joined hatched area between the two frame ground patterns.

Figure 4:
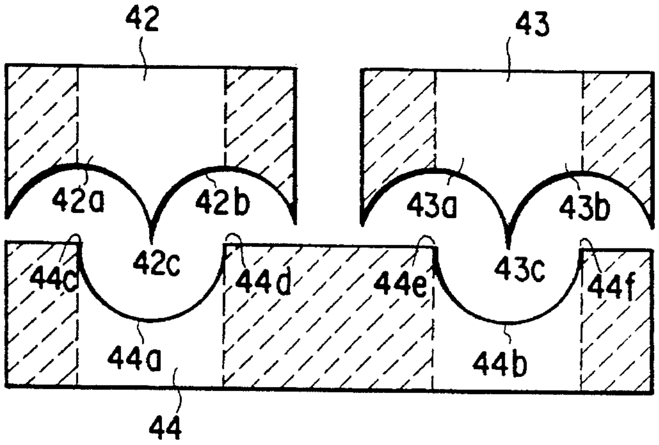
FIG. 4 is a plan view showing an overvoltage protection device including a frame ground pattern according to a third embodiment of the present invention.

FIG. 4 is a plan view showing three patterns on a substrate of an overvoltage protection device according to a third embodiment of the present invention. Like the second embodiment, the third embodiment is so configured that first and second AC patterns 42 and 43 of the same configuration are arranged one to the right and one to the left with a frame ground pattern 44 located to face the first and second AC patterns 42 and 43. The AC pattern 42 has two side-by-side concave circular arc sections 42*a* and 42*b* having a radius "r" each and the AC pattern 43 has two side-by-side concave circular arc sections 43*a* and 43*b* having a radius "r" each. The frame ground pattern 44 has a concave circular arc sections 44*a* and 44*b* having radiuses "r" with peak points 42*c* and 43*c* of the AC patterns 42 and 43 as their centers, respectively. The ends of the concave circular arc section 44*a* are peak points 44*c* and 44*d* providing the centers of those concave circular arc sections 42*a* and 42*b* of the AC pattern 42. The ends of the concave circular arc section 44*b* are peak points 44*e* and 44*f* providing the centers of those concave circular arc sections 43*a* and 43*b* of the AC pattern 43.

The overvoltage protection device of the third embodiment also obtains the same effect as the aforementioned embodiments. The third embodiment may be modified by omitting those dotted hatched areas in FIG. 4.

Figure 5:
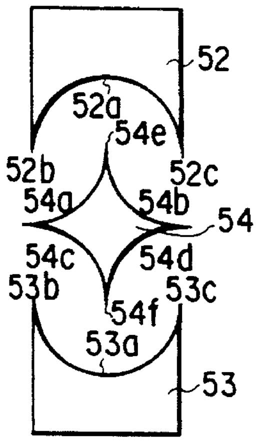
FIG. 5 is a plan view showing an overvoltage protection device including a frame ground pattern according to a fourth embodiment of the present invention.

FIG. 5 is a plan view showing three patterns on a substrate of an overvoltage protection device according to a fourth embodiment of the present invention. The fourth embodiment, like the first embodiment, is so configured that first and second AC patterns 52 and 53 are symmetrically arranged with a frame ground pattern 54 as a center. The AC patterns 52 and 53 have concave circular arc sections 52*a* and 53*a*, respectively, having radius "r" each. Both ends of the concave circular arc section 52*a* provide peak points 52*b* and 52*c* and both ends of the concave circular arc section 53*a*, peak points 53*b* and 53*c*. The frame ground pattern 54 has concave circular arc sections 54*a*, 54*b*, 54*c*, and 54*d* having radiuses "r" with the peak points 52*b*, 52*c*, 53*b* and 53*c* as their centers, respectively. A junction of the concave circular arc sections 54*a* and 54*b* of the frame ground pattern 54 provides a peak point 54*e* corresponding to the center of the concave circular arc section 52*a*. The junction of the concave circular arc sections 54*c* and 54*d* provides a peak point 54*f* corresponding to the center of the concave circular arc section 53*a*.

The overvoltage protection device of the fourth embodiment obtains the same effect as the previous embodiment.

According to the present invention, as set out above, it is possible to prevent any overvoltage which may occur on the power supply line from being applied to the electronic device through the utilization of a discharge between the AC patterns, on one hand, connected to the AC poles of the AC plug and the frame ground pattern, on the other hand, connected to the frame ground pole of the AC plug. Since the two patterns both have a pair of peak point and concave circular arc section and the concave circular arc section corresponds to a given circular arc section of a given radius with the peak point of an opposing pattern as a center, any discharge occurs at all points on the concave circular arc section at an equal distance from the peak point toward the concave circular arc section. As a result, the discharge occurs uniformly on all points on the opposing concave circular arc section without involving local fatigue along the whole concave circular arc section. Further, the discharge start voltage can be set by varying the radius of the concave circular arc section. It is thus possible to realize an overvoltage protection device ingeniously against the withstand voltage of the electronic device.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, in the above-mentioned embodiments, both of the AC patterns connected to the AC poles **12*a* and 12*b* of the AC plug 12 have a pair of peak point and concave circular arc section since it is uncertain that any one of the AC poles 12*a* and 12*b* of the AC plug 12 is brought to a "hot" or a "neutral" state. If, among the AC poles 12*a* and 12*b* of the AC plug 12**, that pole connected to the "hot" line is fixed, neither the peak point nor the concave circular arc section is required for that pattern connected to the "neutral" line. There occurs no discharge between the frame ground pattern and the AC pattern connected to the "neutral" line. That is, it is not necessary to provide an AC pattern connected to the "neutral" line. Further, a negative overvoltage normally occurs at the stroke of lighting. For the overvoltage being a negative one, therefore, no discharge is developed from the frame ground pattern toward the AC pattern and it is, therefore, not necessary to provide any peak point to the frame ground pattern and any concave circular arc section to the corresponding AC pattern. In a practical application, however, a positive overvoltage may sometimes occur due to an effect resulting from the inductive component, etc., on a power transmission line and it is preferable to provide for the occurrence of both the positive and negative overvoltage as set out above. In place of a single overvoltage protection device, more overvoltage protection devices may be provided so that they are connected in series.

What is claimed is:

1. An overvoltage protection device connected between an electronic device and a power supply outlet having a power supply pole and a ground pole, the power supply pole connected to a power supply line, the device comprising:

an insulating substrate:

a first conductive member formed on the insulating substrate, connected to the power supply pole and the electronic device and having a peak point; and a second conductive member formed on the insulating substrate, connected to the ground pole and having a concave circular arc section of a given radius with the peak point as a center.

2. The device according to claim 1, in which the first and the second members comprise first and second copper foils.

3. An overvoltage protection device connected between an electronic device and a power supply outlet having a power supply pole and a ground pole, the power supply pole connected to a power supply line, the device comprising:

an insulating substrate;

a first conductive member formed on the insulating substrate, connected to the power supply pole and having a first peak point and a first concave circular arc section of a given radius; and a second conductive member formed on the insulating substrate, connected to the ground pole and having a second concave circular arc section of the given radius with the first peak point as a center and a second peak point locating at a center of the first concave circular arc section.

4. The device according to claim 3, in which the first and the second members comprise first and second copper foils.

5. An overvoltage protection device connected between an electronic device and a power supply outlet having first and second power supply poles and a ground pole, the first and the second power supply poles connected to an AC power supply line, the device comprising:

an insulating substrate;

a first conductive member formed on the insulating substrate, connected to the first power supply pole and having a first concave circular arc section of a given radius and a first peak point locating at one end of the first concave circular arc section;

a second conductive member formed on the insulating substrate, connected to the second power supply pole and having a second concave circular arc section of the given radius and a second peak point locating at one end of the second concave circular arc section; and a third conductive member formed on the insulating substrate, connected to the ground pole and having a third concave circular arc section of the given radius with the first peak point as a center, a third peak point locating at one end of the third concave circular arc section, a fourth concave circular arc section of the given radius with the second peak point as a center, and a fourth peak point locating at one end of the fourth concave circular arc section.

6. The device according to claim 5, in which said first member further comprises a fifth concave circular arc section connected to the first concave circular arc section at the first peak point and having the given radius with the other end of the third circular arc section as a center; and said second member further comprises a sixth concave circular arc section connected to the second concave circular arc section at the second peak point and having the given radius with the other end of the fourth concave circular arc section as a center.

7. The device according to claim 5, in which said first member further comprises a fifth peak point located at the other end of the first concave circular arc section;

said second member further comprises a sixth peak point located at the other end of the second concave circular arc section; and said third member further comprises a fifth concave circular arc section of the given radius with the fifth peak point as a center and a sixth concave circular section of the given radius with the sixth peak point as a center.

8. The device according to claim 5, in which the first, the second, and the third members comprise first, second, and third copper foils.

9. The device according to claim 3, in which said first conductive member further comprises a third concave arc section of the given radius, and said second conductive member further comprises a third peak point locating at a center of the third concave arc section.

* * * * *